Sept. 13, 1932.    B. J. LARSON    1,876,979
EDGE TRIMMER
Filed Sept. 22, 1931
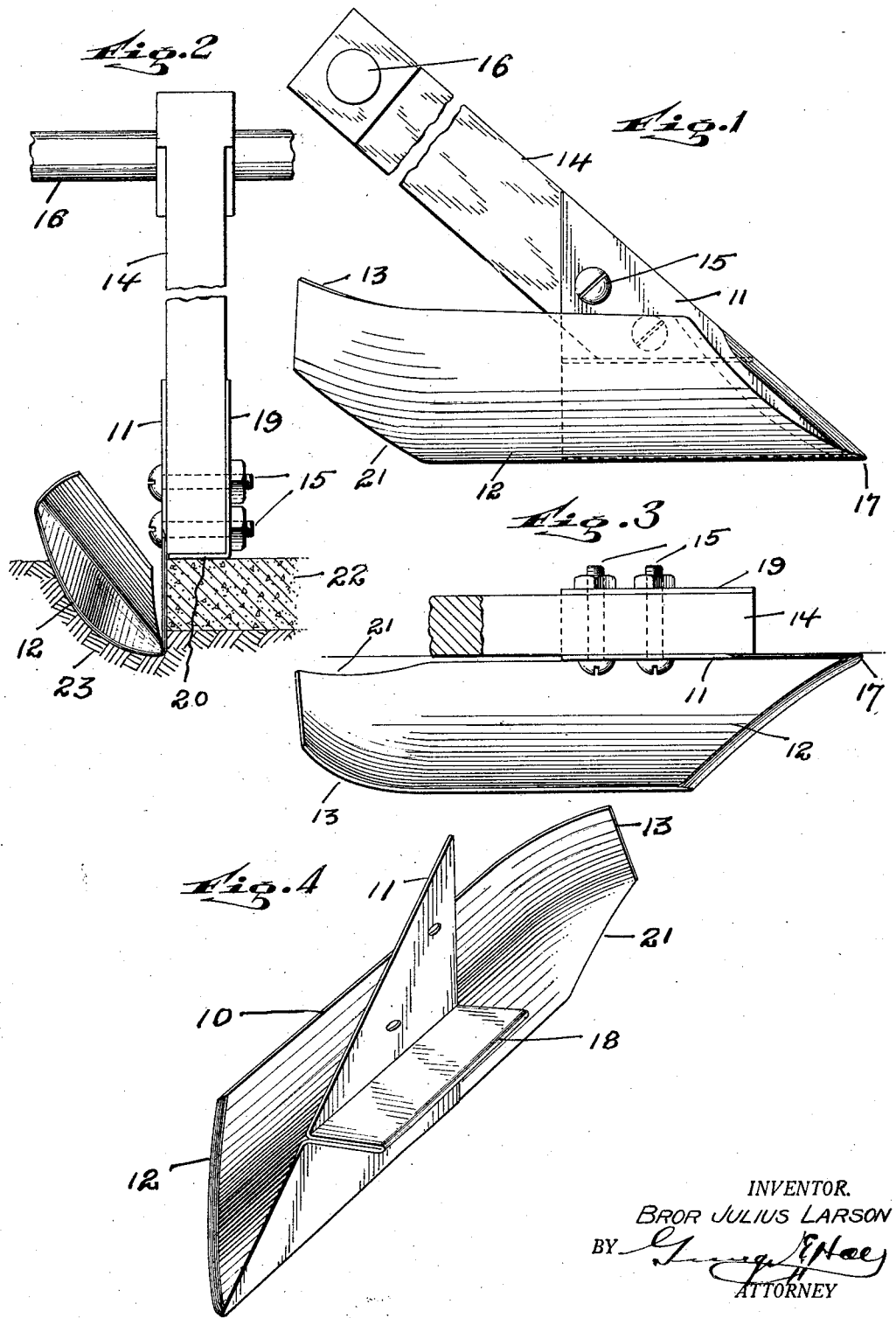
INVENTOR.
BROR JULIUS LARSON
BY
ATTORNEY Patented Sept. 13, 1932

1,876,979

UNITED STATES PATENT OFFICE

BROR JULIUS LARSON, OF HAMDEN, CONNECTICUT

EDGE TRIMMER

Application filed September 22, 1931. Serial No. 564,339.

My invention relates to a new and improved edge trimmer, referring more particularly to that type of such device as is designed for use in trimming the edge of a lawn, garden, or the like, and particularly adjacent to a walk, although not specifically limited thereto. Its many other uses will readily suggest themselves to one conversant with the use of garden and/or lawn tools.

It is the object of this invention, among other things, to provide an edge trimmer of this character that will be composed of the fewest possible parts, rigid in its structure and that will most efficiently cut the earth, turf, vegetation, and other things that may be in its path and leave a trough of uniform width and depth that will be neat in its appearance, and such material as is separated by the trimmer projected on to the walk in rear of the trimmer where it may be readily removed.

To these and other ends my invention consists in the edge trimmer having certain details of construction and combinations of parts as will be hereinafter described and more particularly pointed out in the claims.

In the accompanying drawing wherein like characters of reference indicate like parts in the several figures:

Figure 1 is a fragmentary side view of my new and improved edge trimmer;

Figure 2 is a similar view looking toward the front thereof, in operative position with a walk and adjacent turf, or the like, to illustrate its method of operation;

Figure 3 is a fragmentary plan view thereof; and

Figure 4 is a perspective detailed view of a modified form of cutter.

In the drawing 10 indicates the cutter which is preferably constructed of a single piece of stamped metal, having a cheek plate 11 upon one side thereof, the upper edge of which is preferably at an angle to its length. Projecting outwardly and upwardly from the bottom of the plate is the cutter portion 12 which extends to the rear of the cheek plate and is curved inwardly at 13. The front edge of the cutter portion 12 and the lower inner edge of the cheek plate 11 are cut away so as to provide knife edges thereon.

The cutter is rigidly secured to a handle 14 by bolts 15 or the like. The upper face of this handle is substantially flush with and at the same angle as the upper front edge of the cheek plate 11. For convenience in manipulating the trimmer a rod 16 is projected through the upper end of the handle, extending laterally upon each side whereby the operator may grasp and manipulate the device manually.

By this arrangement of the cutter and the handle, the pressure applied by the operator is transmitted directly in line with the nose 17, the extreme forwardly cutting point of the tool.

Heretofore in mechanisms of this character the pressure has generally been applied at a point rearwardly of and out of alignment with the nose of the cutting tool. The result has been that roots and other substantial obstructions deflect the course of the cutter without functioning. This is especially true of the type of trimmer having wheels associated therewith. With this trimmer, as direct pressure is applied to the point where required, the cutter will remove the roots and/or other obstructions without being deflected from its course.

The cutter is curved inwardly at its rear end and directs the earth and vegetation and other things that enter the cutter at its forward end, on to the sidewalk in rear of the handle, where the same may be readily removed.

My improved mechanism consists of only two parts aside from the bolts, that is, the cutter and the handle. Thus the device may be constructed at the minimum cost, and as indicated, is powerful and effective in its operation. If desired the end of the handle may be protected either by bending the cheek plate 11 laterally upon itself to form a guard plate, as indicated by 18 in Figure 4, or by a wearing plate, 19 as shown in Figure 2, which latter is provided with a foot portion 20 that covers the end of the handle 14, and secured in position by the bolts 15. The lower rear edge of the cutter at 21 is removed so as to effectually clear the edge of the walk when the trimmer is in operation.

In Figure 2, the numerals 22 designate the sidewalk and 23 the adjacent earth and turf. In operation the foot portion 20 rides upon the top of the sidewalk 22 and the cutter functions in the adjacent soil and turf.

What I desire to secure by Letters Patent is:

1. An edge trimmer including a cutter composed of an elongated plate-like member having its rear end curved inwardly to form a deflector for the material cut, a cheek plate of less length than that of the cutter secured at its bottom to the latter and having its rear spaced a distance forwardly of the said curved rear end of the cutter, the front edges of the cutter and cheek plate being substantially in register and having downwardly and forwardly inclined cutting edges, a handle, and means to rigidly secure the handle to the cheek plate at points spaced from the cutter.

2. An edge trimmer including a cutter composed of an elongated plate-like member having its rear end curved inwardly to form a deflector for the material cut, a cheek plate of less length than that of the cutter secured at its bottom to the latter and having its rear spaced a distance forwardly of the said curved rear end of the cutter, the front edges of the cutter and cheek plate being substantially in register and having downwardly and forwardly inclined cutting edges, a guard extending outwardly from the cheek plate, a handle, and means to rigidly secure the handle to the cheek plate at points spaced from the cutter.

In testimony whereof, I have hereunto affixed my signature.

BROR JULIUS LARSON.